No. 763,127. PATENTED JUNE 21, 1904.
J. A. TILDEN.
UNIVERSAL JOINT.
APPLICATION FILED JAN. 9, 1904.
NO MODEL.
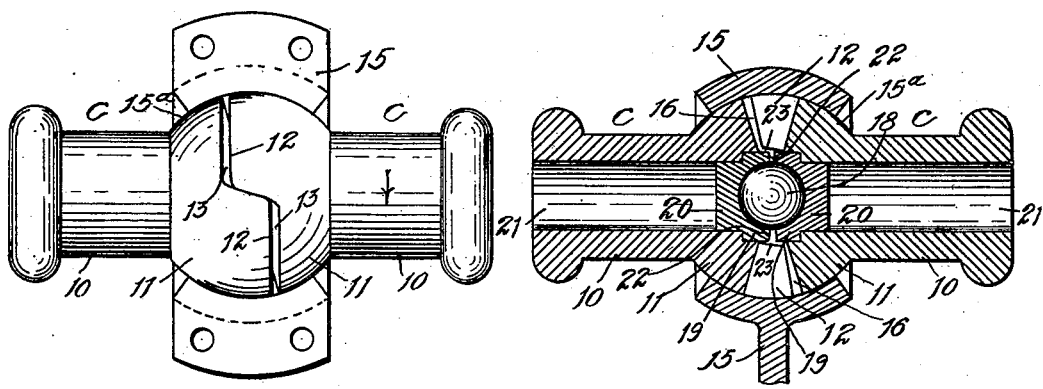
Fig. 1. Fig. 2.
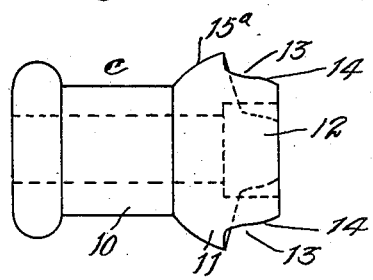 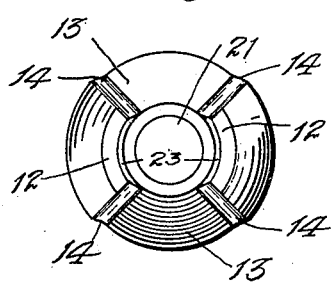
Fig. 3. Fig. 4.
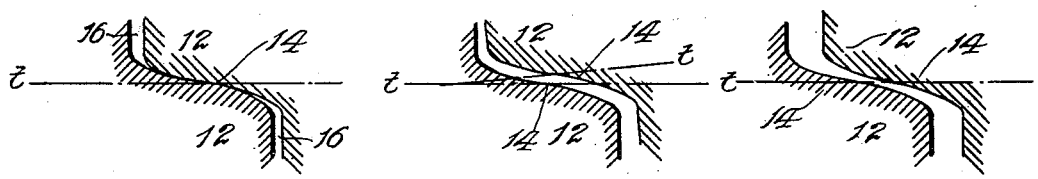
Fig. 5. Fig. 6. Fig. 7.
Witnesses:
Ella W. Cobb
Frank G. Head
Inventor:
James A. Tilden,
by
Attorney No. 763,127. Patented June 21, 1904.

UNITED STATES PATENT OFFICE.

JAMES A. TILDEN, OF HYDEPARK, MASSACHUSETTS, ASSIGNOR TO HERSEY MANUFACTURING COMPANY, OF SOUTH BOSTON, MASSACHUSETTS, A CORPORATION OF MAINE.

UNIVERSAL JOINT.

SPECIFICATION forming part of Letters Patent No. 763,127, dated June 21, 1904.

Application filed January 9, 1904. Serial No. 188,325. (No model.)

*To all whom it may concern:*

Be it known that I, JAMES A. TILDEN, a citizen of the United States, residing at Hydepark, in the county of Norfolk and State of Massachusetts, (whose post-office address is as above,) have invented certain new and useful Improvements in Universal Joints, of which the following is a specification.

My invention relates to universal joints, and more particularly those adapted for the coupling together of shafts which are to have a relative angular movement.

It consists in the features hereinafter described and claimed.

In the accompanying drawings, Figure 1 is a top plan view of one embodiment of my invention with the upper half of the box removed and the members in alinement. Fig. 2 is a central vertical longitudinal section thereof. Fig. 3 is a side elevation of one member. Fig. 4 is an end elevation of the same. Fig. 5 is an enlarged diagrammatic detail of the contact-faces of coacting teeth when the axes are at an angle and taken in the plane of angular displacement; and Figs. 6 and 7 are similar views of the adjacent sides of the teeth, taken, respectively, at ninety degrees and one hundred and eighty degrees therefrom.

Similar characters indicate like parts throughout the several figures of the drawings.

The letters C C designate two coupling members, here shown as of similar form, to which shafts or other elements to be joined may be connected. Each member may consist of a body portion 10, having at one extremity a head 11, from the end of which extend contact projections or teeth 12, preferably two in number. These projections are separated by spaces 13 to receive the projections of the companion member. It will be seen that when the coupling members are in axial alinement, rotation being considered as in the direction of the arrow in Fig. 1, the teeth of the driving member will exert at their sides 14 a direct thrust upon those of the other member with no relative movement, but that when these members are so shifted that their axes lie at an angle to one another the intermeshing teeth bear the same relation as those of bevel-gears when approaching the limit of action or a position of parallelism. To render this action as far as possible smooth and free from friction, it is obviously desirable that the tooth contact should be such that the action at the pitch-circles will be rolling rather than sliding, and this would be attained by making the contact-surfaces correspond as nearly as possible with what is termed in gearing an "odontoid," or a tooth curve having its normals at the pitch-point arranged in a continuous progressive manner—that is, intersecting the pitch-line at regular consecutive points. Such a result would be attained, for example, by contact-faces having substantially a cycloidal or involute form. The approximate relations of the teeth when the axes are at an angle are illustrated in Figs. 5 to 7, in which Figs. 5 and 7 show the faces in the plane of displacement and at opposite sides of the joint, while Fig. 6 shows the backs of the teeth, the normals $t$ at the pitch-points in this latter figure indicating the angularity of the axes.

To support the joint and prevent springing or lateral movement, a bearing 15 may be provided embracing the heads of the members. To allow this, the exterior of the heads at 15$^a$ are made in the form of a sphere having its center at the center of symmetry of the coacting teeth, and this spherical surface is, by my construction and for the range of movement for which this joint is particularly designed, kept almost continuous, it being only broken by narrow clearance-spaces 16 between the sides of the teeth and between their ends and the bottom of the spaces. It may also be noted here that the surfaces of the teeth and the spaces naturally converge toward this common center. This surface 15$^a$ furnishes a very effectual element to journal in the bearing, which, preferably, largely surrounds the joint and renders lateral displacement impossible, and also by virtue of embracing or overhanging the outer sides of each head holds them against longitudinal separation, while in no wise interfering with the freedom of angular movement. Moreover, the bearing preferably entirely covers the clearance-spaces, and thus prevents the entrance of dirt from outside.

To maintain the coupling members in proper relation with each other and with the surrounding bearing, a preferably loose intermediate spacing and thrust member is provided, here shown as a ball 18, conveniently fitting depressions in receivers or cups 19, located in recesses in the ends of the heads and having stems 20 extending into bores 21 therein. The center of this ball should lie at the center of symmetry of the system, and it is clear that it will not only serve to receive the thrust of the members toward each other, but will also hold their outer surfaces in close contact with the bearing and the ends of the members properly separated without impairing the freedom of rotation or angular play. To allow for this angularity in addition to the tooth-clearance at 16, the opposite faces of the cups are cut away or relieved at 22, conveniently upon radial lines, to furnish a clearance-space, and the inner side of the teeth are beveled at 23 for the same purpose.

It will be seen that this joint will give universal movement of the connected members smoothly and noiselessly without the possibility of the parts springing, that its form is such as to largely exclude dirt, and that this, with the reduction of sliding contact, minimizes wear.

Having thus described my invention, I claim—

1. A universal joint comprising two coupling members having at their adjacent ends coöperating projections and recesses at the center of the projections, a separable cup seated in each recess, and a ball coacting with the cups.

2. A universal joint comprising two coupling members having at their adjacent ends coöperating projections, recesses at the center of the projections and axial bores extending from the recesses, a cup seated in each recess and being provided with a stem extending into the bore, and a ball coacting with the cups.

3. A universal joint comprising two coupling members having at their adjacent ends coöperating projections and recesses at the center of the projections, a separable cup seated in each recess, there being a clearance-space provided between the inner faces of the projections and the adjacent faces of the cups, and a ball coacting with the cups.

4. A universal joint comprising coupling members provided at their ends with intermeshing projections having their sides possessing the contour of a tooth curve in which the normals at the pitch-point are arranged in a continuous progressive manner.

Signed at Boston, in the county of Suffolk and State of Massachusetts, this 31st day of December, 1903.

JAMES A. TILDEN.

Witnesses:
FRED Y. FRENCH, Jr.,
FRANCIS C. HERSEY, Jr.